(12) United States Patent
Zaghib et al.

(10) Patent No.: US 11,453,835 B2
(45) Date of Patent: *Sep. 27, 2022

(54) POLYMERS AND THE USE THEREOF AS LUBRICATING AGENTS IN THE PRODUCTION OF ALKALI METAL FILMS

(71) Applicant: HYDRO-QUÉBEC, Montréal (CA)

(72) Inventors: Karim Zaghib, Longueuil (CA); Michel Armand, Paris (FR); Patrick Bouchard, Shawinigan (CA); Serge Verreault, St-Tite (CA); Julie Hamel-Pâquet, Montréal (CA); Gabriel Girard, Longueuil (CA)

(73) Assignee: HYDRO-QUEBEC, Montreal (CA)

( * ) Notice: Subject to any disclaimer, the term of this patent is extended or adjusted under 35 U.S.C. 154(b) by 197 days.

This patent is subject to a terminal disclaimer.

(21) Appl. No.: 16/946,048

(22) Filed: Jun. 4, 2020

(65) Prior Publication Data

US 2020/0291323 A1    Sep. 17, 2020

Related U.S. Application Data

(63) Continuation of application No. 16/158,996, filed on Oct. 12, 2018, now Pat. No. 10,711,218, which is a continuation of application No. 15/300,412, filed as application No. PCT/CA2015/050256 on Mar. 31, 2015, now Pat. No. 10,106,758.

(Continued)

(51) Int. Cl.

| | |
|---|---|
| *C10M 107/44* | (2006.01) |
| *H01M 4/134* | (2010.01) |
| *H01M 4/36* | (2006.01) |
| *H01M 4/40* | (2006.01) |
| *H01M 4/62* | (2006.01) |
| *C10M 149/14* | (2006.01) |
| *C10M 107/28* | (2006.01) |
| *C10M 107/42* | (2006.01) |
| *B21B 1/22* | (2006.01) |
| *B21B 1/40* | (2006.01) |
| *B21D 33/00* | (2006.01) |
| *H01M 4/04* | (2006.01) |
| *H01M 4/38* | (2006.01) |
| *H01M 10/0525* | (2010.01) |
| *H01M 10/052* | (2010.01) |
| *C10N 20/04* | (2006.01) |
| *C10N 40/14* | (2006.01) |
| *C10N 50/00* | (2006.01) |
| *C10N 60/00* | (2006.01) |
| *C10N 80/00* | (2006.01) |

(52) U.S. Cl.
CPC ............ *C10M 107/44* (2013.01); *B21B 1/22* (2013.01); *B21B 1/40* (2013.01); *B21D 33/00* (2013.01); *C10M 107/28* (2013.01); *C10M 107/42* (2013.01); *C10M 149/14* (2013.01); *H01M 4/04* (2013.01); *H01M 4/0409* (2013.01); *H01M 4/0416* (2013.01); *H01M 4/0435* (2013.01); *H01M 4/134* (2013.01); *H01M 4/366* (2013.01); *H01M 4/382* (2013.01); *H01M 4/405* (2013.01); *H01M 4/628* (2013.01); *H01M 10/0525* (2013.01); *C10M 2203/1025* (2013.01); *C10M 2203/1045* (2013.01); *C10M 2205/028* (2013.01); *C10M 2209/086* (2013.01); *C10M 2217/0285* (2013.01); *C10M 2217/06* (2013.01); *C10M 2217/065* (2013.01); *C10N 2020/04* (2013.01); *C10N 2040/17* (2020.05); *C10N 2050/023* (2020.05); *C10N 2060/09* (2020.05); *C10N 2080/00* (2013.01); *H01M 10/052* (2013.01)

(58) Field of Classification Search
CPC . C10M 107/44; C10M 107/28; C10M 149/14
See application file for complete search history.

(56) References Cited

U.S. PATENT DOCUMENTS

| 3,642,713 A | 2/1972 | Essig et al. |
| 3,721,113 A | 3/1973 | Hovsepian et al. |

(Continued)

FOREIGN PATENT DOCUMENTS

| EP | 1000674 A2 | 5/2000 |
| GB | 2230021 A | 10/1990 |

(Continued)

OTHER PUBLICATIONS

The extended European Search Report dated Oct. 25, 2017, by the European Patent Office in corresponding European Patent Application No. 15773352.8 (8 pages).

(Continued)

*Primary Examiner* — Amanda C. Walke
(74) *Attorney, Agent, or Firm* — Buchanan Ingersoll & Rooney P.C.

(57) ABSTRACT

Polymers used as rolling lubricating agents, to compositions including said polymers, and to alkali metal films including the polymers or compositions on the surface(s) thereof. The use of said polymers and compositions is also described for strip-rolling alkali metals or alloys thereof in order to obtain thin films. Methods for producing said thin films, which are suitable for use in electrochemical cells, are also described. An improved lubricant according to formula I, which, for example, achieves enhanced conductivity, and/or enables the production of electrochemical cells having an improved life span in cycles.

27 Claims, No Drawings

Related U.S. Application Data

(60) Provisional application No. 61/973,493, filed on Apr. 1, 2014.

(56) References Cited

U.S. PATENT DOCUMENTS

| | | | |
|---|---|---|---|
| 4,824,746 | A | 4/1989 | Robitaille et al. |
| 5,705,603 | A | 1/1998 | Krull et al. |
| 5,837,401 | A | 11/1998 | Armand et al. |
| 6,019,801 | A | 2/2000 | Armand et al. |
| 6,303,795 | B1 * | 10/2001 | Jahnke ............. C08F 8/44 |
| | | | 548/545 |
| 6,506,840 | B2 | 1/2003 | Harunari et al. |
| 6,517,590 | B1 | 2/2003 | Armand et al. |
| 6,855,788 | B2 | 2/2005 | Sanchez et al. |
| 6,903,174 | B2 | 6/2005 | Sanchez et al. |
| 8,524,644 | B2 | 9/2013 | Kawata et al. |
| 2002/0110739 | A1 | 8/2002 | McEwen et al. |
| 2004/0121162 | A1 | 6/2004 | Yamaoka et al. |
| 2011/0100402 | A1 | 5/2011 | Soane et al. |

FOREIGN PATENT DOCUMENTS

| | | |
|---|---|---|
| TW | 201136953 A | 11/2011 |
| WO | 9322409 A1 | 11/1993 |
| WO | 03063287 A2 | 7/2003 |
| WO | 2004068610 A2 | 8/2004 |
| WO | 2008009107 A2 | 1/2008 |
| WO | 2009111860 A1 | 9/2009 |
| WO | 2012071668 A1 | 6/2012 |

OTHER PUBLICATIONS

Gouzy, et al., "In Vitro Blood Compatibility of Polymeric Biomaterials Through Covalent Immobilization of an Amidine Derivative", Biomaterials, vol. 25, No. 17, Aug. 1, 2004, pp. 3493-3501.

International Search Report {PCT/ISA/210) dated Jun. 18, 2016, by the Canadian Patent Office as the International Searching Authority for International Application No. PCT/CA2015/050256.

Written Opinion (PCT/ISA/237) dated Jun. 18, 2016, by the Canadian Patent Office as the International Searching Authority for International Application No. PCT/CA2015/050256 with English Translation.

Schmidt, et al., "Modification of poly (octadecene-alt-rnaleic anhydride) films by reaction with functional amines", Journal of applied polymer science, vol. 87, Issue 8, pp. 1255-1266.

Whittingham, "Lithium Batteries and Cathod Materials", Chemical Review, vol. 104, 2004, pp. 4271-4301.

* cited by examiner

POLYMERS AND THE USE THEREOF AS LUBRICATING AGENTS IN THE PRODUCTION OF ALKALI METAL FILMS

CROSS REFERENCE TO RELATED APPLICATION

The present application is a continuation of U.S. application Ser. No. 16/158,996, filed on Oct. 12, 2018, which is a continuation of U.S. application Ser. No. 15/300,412, filed 29 Sep. 2016, now U.S. Pat. No. 10,106,758, which is a U.S. national stage of International Application No. PCT/CA2015/050256, filed on 31 Mar. 2014, which claims priority to the provisional U.S. Application No. 61/973,493, which is incorporated here by reference in its entirety and for all purposes. The entire contents of each of U.S. application Ser. No. 16/158,996, U.S. application Ser. No. 15/300,412, U.S. Provisional Application No. 61/973,493, and International Application No. PCT/CA2015/050256 are hereby incorporated herein by reference in their entirety.

TECHNICAL FIELD

The technology relates to the field of polymers and to their use as lubricating agents for rolling (between rollers) and to the compositions including them. The technology also relates to films of alkali metals, including the lubricating agents and/or the composition on one surface or on the two surfaces thereof. The technology is also connected with the methods for producing thin alkali metal films or alloys thereof, including the use of the lubricating agents and of the compositions, and with the films thus produced, which are suitable for use in electrochemical cells.

Context

The production of thin lithium films in the form of broad bands, and in lengths of several tens of meters by rapid and reliable processes faces serious technical difficulties attributable to the extreme physical and chemical properties of this metal: chemical reactivity, malleability, rapid self-welding by simple contact, and strong adhesion to most solid materials, including the usual metals.

The previous rolling methods as described in the U.S. Pat. No. 3,721,113, use rollers made of hard plastic or of plastic-coated metal, but successive passes of the film between the rollers were needed in order to obtain a film of about 30 to 40 µm. Processes based on the coating of molten lithium on a metal or plastic support have also been described in the U.S. Pat. No. 4,824,746.

The difficulties encountered in carrying out the rolling of thin lithium films having a thickness that can range from 5 to 40 microns, for example, are mainly due to the reactivity and to the adhesion of the rolled metal to the materials with which they are in contact (e.g., the rolling rollers, the plastic protection films, the rolling additives) as well as to the poor mechanical properties of the thin strips. For example, a lithium film having a thickness of 20 µm and a width of 10 cm breaks under a tensile stress of 579.13 kPa or more, which makes it impossible to pull the film at the outlet of the rollers or to detach said film from the rolling rollers if the lithium film adheres ever so slightly to the rollers.

An approach normally used for the rolling or the calendering of hard metals such as iron and nickel is based on the use of liquid rolling additives such as organic solvents that can contain greases or lubricating agents. Examples include the fatty acids or derivatives thereof such as lauric acid or stearic acid, and the alcohols, for example, EPAL 1012™ from Ethyl Corporation U.S.A., a mixture of linear $C_{10}$-$C_{12}$ primary alcohols. For lithium and, more particularly, for lithium intended for use in electrochemical cells, the use of such additives involves major drawbacks resulting from the reactivity of the lithium and/or the nonconductive nature of these additives.

According to an example, the chemical reactivity of the surface of the lithium in contact with solvents or lubricating agents including reactive organic functions (organic acids or alcohols, for example) will create an electronically insulating passivation layer on the surface of the metal, thus limiting the proper operation of the electrochemical cells, in particular in rechargeable batteries.

In a second example, the removal of the lubricating agent or greases remaining in contact with the lithium after rolling is very difficult. These lubricating agents are electrical insulants and they are not soluble in the electrolyte. When they are left on the films produced, they are thus detrimental to the proper operation of the lithium electrodes made therefrom. The washing of these agents on the surface of the lithium film generally leads to a contamination of the surface, that is to say to lithium films of lesser quality.

The rolling methods that use lubricating agents for the more reliable preparation of thin lithium films have been described in the U.S. Pat. Nos. 5,837,401 and 6,019,801. The lubricating agents used in these two patents include polymers comprising solvating polymer chains. The preferred agents described therein are based on fatty acid diesters such as polyoxyethylene distearates of formula: $CH_3(CH_2)_{16}C(O)O(CH_2CH_2O)_nC(O)(CH_2)_{16}CH_3$, in which n varies between 3 and 100, the polymers having polyoxyethylene segments having a molecular weight equal to 200, 400 and 600 being preferable. The method described in said patents enable the production, for example, of lithium films having a length of 300 meters with a thickness of 25 µm±2 µm at a rate of about 20 m/min. It is generally described that these methods can reach a production rate of up to 50 m/min.

While this method was an improvement in comparison to the technology available at the time, there still exists a need for the development of new improved lubricating agents, for example, achieving an increased conductivity and/or enabling the obtention of electrochemical cells with an improved life span in cycles.

Modified polymers based on poly(octadecene-alt-maleic anhydride) films on glass plates have been described in Schmidt et al., 2003, J. Appl. Polym. Sc., 87, 1255-1266. This document in fact refers to the incorporation of functionalized amines in the polymer and to the use of glass plates obtained in studies of covalent immobilization of proteins, a use that is very different from that of lubricating agents in the rolling of alkali metals.

BRIEF DESCRIPTION

According to a first aspect, the present application describes a lubricating agent defined as a polymer of formula I:

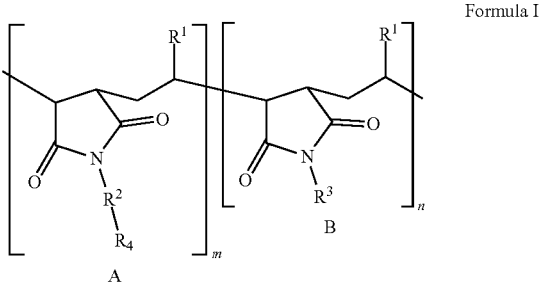

Formula I in which m is a positive whole number and denotes the number of repeated units A in the polymer; n is zero or a positive whole number and denotes the number of repeated units B in the polymer, the repeated unit B being absent when n is zero, where m and n are selected so that the molecular weight of the polymer of Formula I is in the range from 1000 to $10^6$;

$R^1$, independently at each occurrence, is selected from the linear or branched monovalent hydrocarbon radicals;

$R^2$, independently at each occurrence, is selected from —$CH_2CH_2O$— and —$CH_2CH_2CH_2O$—, where $R^2$ is bound to N by a carbon atom, or $R^2$ is absent and N is covalently bound to $R^4$;

$R^3$, independently at each occurrence, is selected from the linear or branched monovalent hydrocarbon radicals;

$R^4$, independently at each occurrence, is a polyether residue of formula —[$CH(R^5)CH_2O]_sCH_3$, where $5 \leq s \leq 100$; and $R^5$, independently at each occurrence, is H or $CH_3$.

According to an embodiment, m and n are selected so that the molecular weight of the lubricating agent of Formula I is in the range from 2000 to 250,000, or from 2000 to 50,000, or even from 50,000 to 200,000. According to another embodiment, the ratio of the repeated units A:B expressed as mole percent in the polymer is in the range from 100:0 to 10:90.

According to another embodiment, $R^1$, independently at each occurrence, is a linear or branched hydrocarbon radical of formula $C_rH_{2r+1}$, where $4 \leq r \leq 24$ or in which $8 \leq r \leq 18$ and all the other groups are as defined above. In another embodiment, $R^3$, independently at each occurrence, is a linear or branched hydrocarbon radical of formula $C_tH_{2t+1}$, where $4 \leq t \leq 24$, or in which $8 \leq t \leq 18$, and all the other groups are as defined above. In another embodiment, s is selected from the whole numbers from 8 to 50, and all the other groups are as defined above.

According to another embodiment, $R^2$, at each occurrence, is a divalent radical of formula —$CH_2CH_2O$—, or $R^2$, at each occurrence, is a divalent radical of formula —$CH_2CH_2CH_2O$—, or even $R^2$ is absent, and all the other groups are as defined above.

According to an embodiment, $R^4$ is a polyether residue of formula —[$CH(R^5)CH_2O]_sCH_3$, in which $R^5$ is $CH_3$ at each occurrence, and all the other groups are as defined above. In another embodiment, $R^5$ is a hydrogen atom at each occurrence, and all the other groups are as defined above. According to another embodiment, $R^5$, independently at each occurrence, is $CH_3$ or hydrogen, such that $R^4$ is a polyether residue including repeated units of propylene oxide (PO) and of ethylene oxide (EO), for example, in a molar ratio of PO:EO between about 20:1 and about 1:30, or between about 10:1 and about 1:10. According to an example, the polyether residue $R^4$ has a molecular weight in the range from about 300 g/mole to about 5000 g/mole, or from about 500 g/mole to about 2500 g/mole.

According to another embodiment, the lubricating agent is selected from the Polymers 1 to 5 as defined in Table 1.

According to another aspect, the present application describes a composition including a lubricating agent as defined here, jointly with a solvent that is inert with respect to the alkali metals. For example, the solvent is selected from the hydrocarbon solvents, the aromatic solvents, and combinations thereof, that is to say systems of solvents including an aromatic solvent and a hydrocarbon solvent. The hydrocarbon solvent can be selected from hexane and heptane, and the aromatic solvent can be toluene. According to an embodiment, the composition includes the lubricating agent at a concentration from about 0.001% to about 10% (weight/volume), or about 0.01% to about 5% (weight/v) of the total volume of the composition.

According to another aspect, the present application also describes an alkali metal film having a first surface and a second surface, and including on at least one of the first and second surfaces, a thin layer of the lubricating agent or of the composition. For example, the alkali metal film has a thickness in the range from about 5 µm to about 50 µm. According to an embodiment, the alkali metal is selected from lithium, the lithium alloys, sodium, and the sodium alloys, or lithium having a purity of at least 99% by weight, or a lithium alloy including less than 3000 ppm of impurities by weight.

In another embodiment, the alkali metal film as defined here includes a passivation layer on at least one of the first and second surfaces thereof, possibly on the two surfaces thereof. For example, the passivation layer can have a thickness of 500 Å or less, of 100 Å or less, or even of 50 Å or less. For example, the alkali metal is lithium or a lithium alloy, and the passivation layer includes $Li_2O$, $Li_2CO_3$, LiOH, or a combination of at least two of said compounds.

According to yet another aspect, the present application describes a method for producing an alkali metal film and the alkali metal film thus produced, the method including the steps:

a) of application of a composition including a lubricating agent as defined here on at least one of the first and second surfaces of an alkali metal strip, in order to obtain a lubricated alkali metal strip; and b) of rolling the lubricated alkali metal strip obtained in step (a) between at least two rollers, in order to produce an alkali metal film.

In an embodiment, at least steps (a) and (b) are performed in an essentially dry air atmosphere, for example, in an anhydrous chamber or a chamber with controlled humidity with a dew point between −45 and −55° C., for 0.7 to 2.2% relative humidity, preferably a dew point of about −50° C. and a relative humidity of about 1.3%.

According to another embodiment, the method includes, in addition, a step of obtention of the alkali metal strip, for example, by extrusion of an ingot or a rod made of an alkali metal.

According to another aspect, step (a) is carried out by the application of the composition on the strip at the inlet of the rollers and can also be carried out by a prior coating of the rolling rollers with or without additional addition of composition directly onto the strip before step (b).

The alkali metal films as defined here can be used, among other purposes, for the production of electrodes and of electrochemical cells that include them in combination with an electrolyte and a counterelectrode, preferably both in the form of films. The electrolyte can be a nonaqueous liquid electrolyte including a compatible organic solvent, a liquid electrolyte consisting of a molten salt, a polymer electrolyte gel or a polymer electrolyte solid. The counterelectrode includes an active counterelectrode material as defined here or as generally used in the field.

DETAILED DESCRIPTION

The detailed description and the following examples are given for illustration and should not be interpreted as further limiting the scope of the invention.

The term "about" as used in the present document means approximately, in the region of, around. When the term "about" is used in connection with a numerical value, it modifies it by increasing or decreasing it by a 10% variation with respect to the nominal value. This term can also take into account, for example, the experimental error of a measurement apparatus.

When a range of values is mentioned in the present application, the lower and upper limits of the range are always included in the definition, unless indicated otherwise.

I. The Lubricating Agents and the Compositions Thereof:

The polymers described here are useful as lubricating agents used in rolling alkali metal films. These agents are alkyl succinimide polyether copolymers of Formula I:

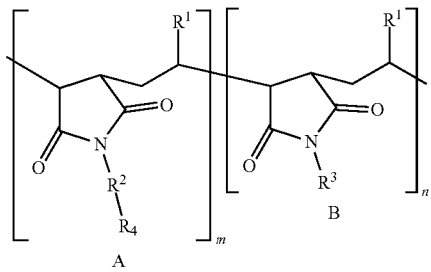

Formula I in which m and n denote the number of repeated units A and B, respectively, in the polymer, m being a positive whole number and n being a positive whole number or zero when the repeated unit B is absent, and where m and n are selected such that the molecular weight of the polymer of Formula I is in the range from 1000 to $10^6$, from 2000 to 250,000, from 2000 to 100,000, from 2000 to 50,000, or even from 50,000 to 200,000, limits included;

$R^1$, independently at each occurrence, is selected from the linear or branched monovalent hydrocarbon radicals, preferably from the linear or branched monovalent hydrocarbon radicals of formula $C_rH_{2r+1}$, where $4 \leq r \leq 24$, preferably where $8 \leq r \leq 18$;

$R^2$, independently at each occurrence, is selected from —$CH_2CH_2O$— and —$CH_2CH_2CH_2O$—, where $R^2$ is bound to N by a carbon atom, or $R^2$ is absent and N is covalently bound to $R^4$;

$R^3$, independently at each occurrence, is selected from the linear or branched monovalent hydrocarbon radicals, preferably from the linear or branched monovalent hydrocarbon radicals of formula $C_tH_{2t+1}$, where $4 \leq t \leq 24$, preferably where $8 \leq t \leq 18$;

$R^4$, independently at each occurrence, is a polyether residue of formula —$[CH(R^5)CH_2O]_sCH_3$, where $5 \leq s \leq 100$, preferably where $8 \leq s \leq 50$; and $R^5$, independently at each occurrence, is a hydrogen atom or a $CH_3$ group.

According to an embodiment, the ratio of the repeated units A:B expressed as mole percent in the lubricating agent is between 100:0 and 10:90, preferably between 100:0 and 20:80, limits included. According to another embodiment, the ratio of the repeated units A:B expressed as mole percent in the lubricating agent is between 60:40 and 10:90.

According to an embodiment, $R^4$ is a polyether residue of formula —$[CH(R^5)CH_2O]_sCH_3$, in which $5 \leq s \leq 100$, and $R^5$ is $CH_3$ at each occurrence, preferably where $8 \leq s \leq 50$. In another embodiment, $R^4$ is a polyether residue of formula —$[CH(R^5)CH_2O]_sCH_3$, in which $5 \leq s \leq 100$, and $R^5$ is a hydrogen atom at each occurrence, preferably where $8 \leq s \leq 50$. According to a different mode, $R^4$ is a polyether residue of formula a polyether residue of formula —$[CH(R^5)CH_2O]_sCH_3$, in which $5 \leq s \leq 100$, and $R^5$, independently at each occurrence, is $CH_3$ or hydrogen, preferably where $8 \leq s \leq 50$, $R^4$ thus being a polyether chain having repeated units of propylene oxide (PO) and of ethylene oxide (EO) (also referred to here as a polyether chain PO/EO).

According to an embodiment, $R^4$ is a polyether chain PO/EO covalently bound to N (the nitrogen atom of a succinimide group). Examples of these polyether chains PO/EO include, without limitation, the polyethers having a molar ratio PO/EO varying from about 20:1 to about 1:30, or from about 10:1 to about 1:10, preferably having a molecular weight between about 300 and about 5000, preferably about 500 and about 2500. Examples of $R^4$ also include the polyether chains PO/EO of amine polyethers, the amine group being part of the succinimide of the unit A, such as the monoamines Jeffamine® of the "M" series, for example, the M-600, M-1000, M-2005 and M-2070 (Huntsman Corporation, Texas, U.S.A.), having a respective molar content of PO:EO of 9:1, 3:19, 29:6 and 10:31.

According to an aspect, the content of repeated unit B in the polymer of Formula I is adjusted in order to obtain a polymer that is soluble in a solvent or an apolar solvent system, for example, such a solvent or system of solvents includes hydrocarbon solvents (for example, hexane, heptane), aromatic solvents (for example, toluene), or mixtures thereof.

Nonlimiting examples of lubricating agent polymers of Formula I are as specified in Table 1.

TABLE 1

| Polymer | $R^1$ | $R^2$ | $R^3$ | $R^4$ (PO:EO) | Ratio A:B (approx. mole %) | Molecular weight (approx.) |
|---|---|---|---|---|---|---|
| 1 | $C_{16}H_{33}$ | Absent | Absent | 3:19 | 100:0 | 5000 |
| 2 | $C_{16}H_{33}$ | Absent | Absent | 10:31 | 100:0 | 5000 |
| 3 | $C_{16}H_{33}$ | Absent | $C_{18}H_{37}$ | 3:19 | 33:67 | 145,000-175,000 |
| 4 | $C_{16}H_{33}$ | Absent | $C_{18}H_{37}$ | 10:31 | 20:80 | 165,000-195,000 |
| 5 | $C_{16}H_{33}$ | Absent | Absent | 29:6 | 100:0 | 7000 |

For example, the lubricating agents of Formula I can be prepared by: (a) the obtention of an alternating (alt) copolymer of alkylene $R_1CHCH_2$ and of maleic anhydride, $R_1$ being as defined above. This copolymer is then reacted with an amine of formula $R_4$-$R_2$—$NH_2$, optionally at the same time, beforehand or subsequently with an amine of formula $R_3$—$NH_2$, where $R_2$, $R_3$, and $R_4$ are as defined above. Examples of methods for producing lubricating agents are illustrated here in further detail in Synthesis Examples 1 to 4.

The compositions described here include at least one lubricating agent of Formula I. These compositions can also include additional components such as solvents that are inert with respect to the alkali metals. Examples of solvents include, without limitation, the hydrocarbon solvents (for example, hexane, heptane, etc.), the aromatic solvents (for example, toluene, etc.), or mixtures thereof.

II. Alkali Metal Films

The alkali metal films consist, for example, of lithium or of a lithium alloy, of sodium or a sodium alloy, preferably of lithium or an alloy in which lithium is the major component, preferably lithium having a purity of at least 99% by weight, or a lithium alloy including less than 3000 ppm of impurities by weight.

According to an embodiment, the alkali metal films as produced here includes on one of the two surfaces thereof or on said two surfaces, a thin layer of lubricating agent of Formula I or of a composition including it. For example, the lithium films including on one surface or one of the surfaces at least one lubricating agent or a composition of the invention can generally have a lower impedance in comparison to lithium films produced with the use of other lubricating additives. Other improved properties of these films can also comprise a more stable and more uniform passivation layer, and improved cycling properties.

When the method for producing the thin lithium film is performed in an essentially anhydrous air atmosphere, the passivation layer on the lithium film includes lithium carbonate, lithium oxide and/or lithium hydroxide.

III. Method for the Production of Alkali Metal Films:

The alkali metal films as described here are produced by rolling or calendering between rollers using the lubricating agents of Formula I and the compositions including them. The methods for preparing lithium films by metal rolling are illustrated, for example, in the U.S. Pat. Nos. 5,837,401 and 6,019,801 (both issued in the name of Gauthier et al.). The methods described in Gauthier et al. can be carried out using the lubricating agents and compositions as described here (for example, see Section I above).

For example, a lithium strip having a thickness of about 250 μm is used in the rolling process in order to produce a lithium film. The lithium strips can be obtained, for example, by extrusion of commercially available ingots or rods made of lithium.

In general, a lithium strip, mounted beforehand on an unwinder, is passed between two work rollers. A lubricant is added (for example, by means of a pouring spout onto the strip and/or by prior coating of the work rollers) at the point of insertion of the lithium strip between the two rollers, that is to say immediately before the rolling step. According to an embodiment, the lithium film that comes out of the work rollers can be wound on a winder for later use. In this particular mode, the lubricant acts, at least in part, so as to prevent the adhesion of the lithium film to itself. According to another embodiment, the lubricated lithium film produced is used directly for other rolling steps (for example, by continuous or series rolling) with a layer of solid polymer electrolyte, a protective layer, and/or a current collector (for example, in a current collector/lithium film/electrolyte configuration or in a current collector/lithium film/protective layer/electrolyte) configuration. In each case, the winders or rollers arranged in series supply a sufficient tension to the lithium film in order to reduce the adhesion of the lithium film to the work rollers, but without excessive tension so as to prevent the tearing of the lithium film.

For example, the step of rolling between rollers can produce an alkali metal film at a rate in the range from about 10 m/min to about 50 m/min of alkali metal film.

It is obvious that the work rollers have to consist of and/or be coated with a material that is inert with respect to the alkali metal (such as metal lithium) in the presence of the lubricating agent and/or the composition of the invention. For example, the rollers can consist of hard polymers such as plastics, metal rollers coated with plastic material, rollers made of stainless steel, etc.

The method of the invention can be carried out in an anhydrous atmosphere, preferably in an essentially dry air atmosphere, for example, in an anhydrous chamber or a chamber with controlled humidity, for example, with a dew point between −45 and −55° C., for a relative humidity from 0.7 to 2.2%, preferably a dew point of about −50° C. for 1.3% of relative humidity.

IV. Electrochemical Cells:

The alkali metal films as produced here are useful for producing electrochemical cells. For example, the electrochemical cells include at least one electrode having an alkali material film, such as lithium, as active electrode material, a counterelectrode, and an electrolyte between the electrode and the counterelectrode. An option concerns the electrochemical cells including a plurality of arrangements (for example, a plurality of electrode/electrolyte/counterelectrode or counterelectrode/electrolyte/electrode/electrolyte/counterelectrode arrangements). For example, the cell can be a multilayer material which can be folded or rolled the form of a cylinder.

Electrochemical cells in which the lithium films described here could also be used also comprise the lithium-air electrochemical cells such as those described in the PCT application published under number WO2012/071668 (Zaghib et al.).

According to an aspect, the polymer of Formula I or the composition thereof can be present on the surface between the lithium film and the adjacent layer thereof (for example, the current collector, the electrolyte, etc.), or it can be in part or completely diffuse, dispersed or dissolved in the electrolyte. According to another aspect, the lubricating agent (or the composition thereof) is present between the electrode and the electrolyte and is ion conductive, for example, due to its dissolving the lithium salts present in the electrolyte.

According to a preferred embodiment, the electrochemical cell including a lithium film as described here, is sealed or included in the interior of a sealed compartment.

a. Electrode:

An electrode includes at least one alkali metal film as described in Section II or as prepared by the process of Section III. Preferably, the alkali metal film of the electrode is an active lithium film or an alloy in which lithium is the majority component, preferably lithium having a purity of at least 99% by weight, or a lithium alloy including less than 3000 ppm of impurities by weight.

According to an embodiment, the electrode includes, in addition, a current collector made of a metal layer such as, for example, a nickel or copper layer adhering to the surface of the alkali metal film opposite the surface that faces or will face the electrolyte layer.

Optionally, an ion conductive protective layer can be present between the alkali metal film (for example, Li, Na, or an alloy of either) and the electrolyte, for example, in order to protect the lithium film against degradation and/or in order to prevent the formation of dendrites. An ion conductive protective layer, for example, an ion conductive polymer, a ceramic (for example, a lithium and phosphorus oxynitride (LIPON), etc.), glass, or a combination of two or more of said materials can be applied to the surface of the lithium film or of the electrolyte layer (for example, of a solid polymer electrolyte) before the assembly. The vitreous or ceramic protective layers are applied using standard processes such as cathodic atomization, ablation by laser or plasma. Examples of protective layers are described in the PCT application published under number WO2008/009107 (Zaghib et al.).

b. Electrolyte:

The electrolytes used in these electrochemical cells include any electrolyte compatible with the use of electrodes made of active lithium film or of another alkali metal. Examples of such electrolytes include, without limitations, nonaqueous liquid electrolytes, gel polymer electrolytes, and solid polymer electrolytes. The following electrolytes are given as illustrative examples and should not be interpreted to be limiting.

For example, the compatible liquid electrolytes comprise the organic liquid electrolytes including an aprotic polar solvent such as ethylene carbonate (EC), diethyl carbonate (DEC), propylene carbonate (PC), dimethyl carbonate (DMC), ethyl methyl carbonate (EMC), γ-butyrolactone (γ-BL), vinyl carbonate (VC), and mixtures thereof, and lithium salts such as LiTFSI, LiPF$_6$, etc. Other examples of compatible liquid electrolytes comprise the molten salt electrolytes including lithium salts such as lithium chloride, lithium bromide, lithium fluoride, and compositions including them, or organic salts. Nonlimiting examples of liquid electrolytes of molten salts can be found in US2002/0110739 (McEwen et al.). The liquid electrolyte can impregnate a separator such as a polymer separator (for example, made of polypropylene, polyethylene or of a copolymer thereof.

The compatible gel polymer electrolytes can include, for example, polymer precursors and lithium salts (such as LiTFSI, LiPF$_6$, etc.), an aprotic polar solvent as defined above, a polymerization/crosslinking initiator when they are needed. Examples of such gel electrolytes comprise, without limitations, the gel electrolytes described in the PCT applications published under numbers WO2009/111860 (Zaghib et al.) and WO2004/068610 (Zaghib et al.). A gel electrolyte can also impregnate a separator as defined above.

The solid polymer electrolytes (SPE) can generally include one or more polar solid polymers which can be crosslinked or not, and salts, for example, lithium salts such as LiTFSI, LiPF$_6$, LiDCTA, LiBETI, LiFSI, LiBF$_4$, LiBOB, etc. Polyether type polymers such as polymers based on polyethylene oxide (PEO) can be used, but several other polymers compatible with lithium are also known for producing SPE. Examples of such polymers include the multibranch polymers in the shape of a star or comb, such as those described in the PCT application published under No. WO2003/063287 (Zaghib et al.).

c. Counterelectrode

The counterelectrodes include at least one electrochemically active material (EAM) compatible with the use of alkali metal electrodes and, in particular, metal lithium. Any counterelectrode EAM known from the field can be used in these electrochemical cells. For example, the counterelectrode EAM can operate at a voltage within the range of about 1 V to about 5 V. Examples of counterelectrode EAM can be found, for example, in Whittingham M. S. (2004), *Chem. Rev.*, 104, 4271-4301, which is incorporated here by reference in its entirety and for all purposes.

For an electrode including a lithium film, nonlimiting examples of counterelectrode EAM include the lithium titanates (for example: $Li_4Ti_5O_{12}$), sulfur or materials including sulfur, the lithium and metal phosphates (for example, LiM'PO$_4$ where M' is Fe, Ni, Mn, Co, or combinations thereof), the vanadium oxides (for example: $LiV_3O_8$, $V_2O_5$, etc.), and the lithium and metal oxides, such as $LiMn_2O_4$, LiM"O$_2$ (M" being Mn, Co, Ni or combinations thereof), Li(NM''')O$_2$ (M''' being Mn, Co, Al, Fe, Cr, Ti, Zr, etc., or combinations thereof.

Similarly, the EAM of the counterelectrode, when the electrode includes a sodium film, are known to the person skilled in the art. For example, they include sulfur or a material including sulfur, sodium phosphates, and one or more metals (for example: $Na_2FePO_4F$, $Na_2FeP_2O_7F$, NaVPO$_4$F, $NaV_{1-x}Cr_xPO_4F$, where x<1, for example, 0<x<0.1), or sodium and metal sulfates (for example: $Na_2Fe_2(SO_4)_3$). The counterelectrode EAM can also be oxygen in a lithium-air or sodium-air cell depending on the alkali metal of the electrode.

The counterelectrode can also include an electronic conducting material such as a carbon source, including, for example, Ketjen® carbon, Shawinigan carbon, graphite, vapor grown carbon fibers (VGCF), non-powder carbon obtained by the carbonization of an organic precursor, and a combination of two or more of said materials. The carbon used can be of natural or synthetic origin.

The counterelectrode can be a composite counterelectrode that includes, in addition, a polymer binder, and, optionally, an alkali metal salt such as the lithium salts (for example: LiTFSI, LiDCTA, LiBETI, LiFSI, LiPF$_6$, LiBF$_4$, LiBOB, etc.) or the sodium salts (for example: NaClO$_4$, NaPF$_6$, etc.).

The following examples illustrate the invention and should not be interpreted as limiting the scope of the invention as described.

EXAMPLES

In order to evaluate the effect of the lubricant on the surface of a lithium film, and the resulting properties, lithium films having a thickness of 27 μm, produced according to the procedure described in the U.S. Pat. No. 6,019,801 were immersed in the lubricants tested. The lubricated films were then inserted in electrochemical cells and their properties were measured.

The components used in the Examples below are defined as follows:

PEO(200) distearate: PEO-200 distearate as described in the U.S. Pat. No. 6,019,801.

SPE: "Solid Polymer Electrode" based on a polyether polymer as described in the U.S. Pat. Nos. 6,903,174 and 6,855,788 including LiTFSI as lithium salt in a ratio of 30/1 (oxygen v. Li).

Polymer 1: is a polymer of Formula I having a molecular weight of about 5000, in which the unit B is absent, $R^1$ is $C_{16}H_{33}$, $R^2$ is absent, and $R^4$ is covalently bound to N and represents the Jeffamine® M-1000 residue, a polyetheramine having a ratio PO/EO of 3/19.

Polymer 2: is a polymer of Formula I having a molecular weight of about 5000, in which the unit B is absent, $R^1$ is $C_{16}H_{33}$, $R^2$ is absent, and $R^4$ is covalently bound to N and represents the Jeffamine® M-2070 residue, a polyetheramine having a ratio PO/EO of 10/31.

C—LiFePO$_4$: LiFePO$_4$ coated with carbon

Example 1 (Comparative)

A lubricant was prepared by the addition of 1% by weight of PEO(200) distearate to a mixture of toluene and hexane (80:20 (vol:vol), both anhydrous). A lithium film having a thickness of 27 μm is then immersed in this lubricant for 5 minutes.

a. Symmetric Cell A 4 cm² cell was assembled in the laboratory according to the configuration Li/SPE/Li The initial impedance of the Li/SPE/Li cell at 80° C. was 15 ohms. After six weeks, the impedance reached 111 ohms, showing a 640% increase of the impedance.

b. Asymmetric Cell

A 4 cm² cell was assembled in the laboratory according to the configuration C—LiFePO$_4$/SPE/Li. The cell was then discharged at a C/4 rate and charged at a C/4 rate to a voltage of 2.5 V to 3.8 V at 80° C. The initial capacity of the cell was 158 mAh/g. After 350 cycles, the capacity reached 80% of the initial capacity.

Example 2

The lubricant was prepared by the addition of 1% by weight of Polymer 1 to a mixture of toluene and hexane (80:20 (vol:vol), both anhydrous). A lithium film having a thickness of 27 μm was then immersed into this lubricant for about 5 minutes.

a. Symmetric Cell

A 4 cm² cell was assembled in the laboratory according to the configuration Li/SPE/Li. The initial impedance of the cell of configuration Li/SPE/Li at 80° C. was 22 ohms. After six weeks, the impedance reached 48 ohms, showing a 120% increase of the impedance.

b. Asymmetric Cell

A 4 cm² cell was assembled in the laboratory according to the configuration C—LiFePO$_4$/SPE/Li as in Example 1(b). The cell was then discharged at a C/4 rate and charged at a C/4 rate to a voltage of 2.5 V to 3.8 V at 80° C. The initial capacity of the cell was 160 mAh/g. After 1100 cycles, the capacity reached 80% of the initial capacity.

c. Conclusions

The increase of the impedance is lower in this cell than in that of Example 1, where a lubricant based on PEO(200) distearate was used. The use of a lubricant based on Polymer 1 results in a stable and more uniform passivation layer on the surface of the lithium. The cell incorporating the lithium film including a thin layer of Polymer 1 resulted in an improved life span in cycles compared to the cell described in Example 1.

Example 3

The lubricant was prepared by the addition of 1% by weight of Polymer 2 to a mixture of toluene and hexane (80:20 (vol:vol), both anhydrous). A lithium film having a thickness of 27 μm was then immersed in this lubricant for about 5 minutes.

a. Symmetric Cell

A 4 cm² cell was assembled in the laboratory according to the configuration Li/SPE/Li. The initial impedance of the cell having the configuration Li/SPE/Li at 80° C. was 23 ohms. After six weeks, the impedance reached 45 ohms, showing a 96% increase of the impedance.

b. Asymmetric Cell

A 4 cm² cell was assembled in the laboratory according to the configuration C—LiFePO$_4$/SPE/Li as in Example 1(b). The cell was then discharged at a C/4 rate and charged at a C/4 rate to a voltage of 2.5 V to 3.8 V at 80° C. The initial capacity of the cell was 161 mAh/g. After 1300 cycles, the capacity reached 80% of the initial capacity (a 20% lowering).

c. Conclusions

The increase of the impedance is lower for this cell than for that of Example 1(b), where the lubricant based on PEO(200) distearate was used. The use of the lubricant based on Polymer 2 also results in a very stable and more uniform passivation layer on the lithium surface. This cell also resulted in an improved life span in cycles compared to the cell described in Example 1(b).

Synthesis Example 1

36.26 g of a commercial poly(octadecene-alt-maleic anhydride) polymer ($M_w \approx 65.000$) are dissolved in 250 mL of toluene under stirring at room temperature. Octadecylamine (18 g) in 100 mL of toluene is added dropwise to the solution under stirring over a time period of 2 hours. Then, 40 g of Jeffamine® of type M-1000 (XTJ-506) with a ratio PO/EO of 3:19 diluted in 50 mL of toluene are added rapidly and still under stirring. The resulting ternary solution is then placed in a 500 mL round-bottom flask equipped with a Dean-Stark apparatus and a condenser. The solution is heated at reflux for 8 hours, a time period during which the water released during the formation of the imide gradually appears in the burette of the Dean-Stark apparatus.

The resulting viscous polymer solution is then filtered and evaporated in a rotary evaporator. The sticky substance obtained is redissolved in 625 mL of heptane and washed 5 times with a volume of 100 mL of an aqueous solution of sulfuric acid ($H_2SO_4$) at 0.1 M in order to eliminate the excess of Jeffamine®. The extraction of the Jeffamine® is then followed by a rinsing with 5 portions of demineralized water. The drying of the heptane solution is carried out by the addition of 40 g of 4 Å molecular sieve which was treated beforehand under a vacuum at 200° C. The solution at 10% (weight/volume) of Polymer 3 in heptane thus obtained is ready for dilution and/or subsequent use in the rolling of an alkali metal such as lithium.

Synthesis Example 2

36.26 g of a commercial poly(octadecene-alt-maleic anhydride) polymer ($M_w \approx 65.000$) and 11 g of trimethylamine are dissolved in 250 mL of toluene under stirring at room temperature. Octadecylamine (21.5 g) in 100 mL of toluene is added dropwise to the solution under stirring over a time period of 2 hours. Then, 45 g of Jeffamine® of type M-2070 with a ratio PO/EO of 10:31 dissolved in 100 mL of toluene are added rapidly and still under stirring. The resulting quaternary solution is then placed in a 500 mL round-bottom flask equipped with a Dean-Stark apparatus and a condenser. The solution is heated at reflux for 8 hours, a time period during which water released during the formation of the imide gradually appears in the burette of the Dean-Stark apparatus.

The resulting viscous polymer solution is then filtered and evaporated. The waxy substance obtained is redissolved in 900 mL of heptane and washed 5 times with a volume of 200 mL of an aqueous sulfuric acid solution ($H_2SO_4$) at 0.1 M in order to eliminate the Jeffamine® and trimethylamine excess. The extraction is then followed by a rinsing with 5 portions of demineralized water. The drying of the heptane solution is carried out by adding 40 g of 4 Å molecular sieve treated beforehand under a vacuum at 200° C. The solution at 10% (weight/volume) of Polymer 4 in heptane thus obtained is ready for dilution and/or subsequent use in the rolling of an alkali metal such as lithium.

Synthesis Example 3

10 g of commercial maleic anhydride (Aldrich) are added to a solution of 105 g of Jeffamine® M-1000 (Huntsman corporation) in 300 mL of toluene. The reaction mixture is submitted to a Dean-Stark dehydration in order to carry out the imidization of the terminal $NH_2$ groups of the Jeffamine for 5 hours. The clear solution obtained is cooled to a temperature of 0° C., and 25.8 g of 1-octadecene and 1.3 g of azobis(isobutyronitrile) are added. The mixture is deaerated by nitrogen bubbling (100 mL/min) for one hour. The neutral gas sweeping is stopped, and the reaction mixture is heated to 80° C. for 24 hours. The solution which has a slightly brown coloration is washed three times with a 0.1 M sulfuric acid solution, then it is washed again three times with pure water. The supernatant solution is separated, and the toluene is evaporated. The result is a viscous liquid having a molecular weight of about 5000 g/mol (Polymer 1) which can be used in a rolling process.

Synthesis Example 4

In a manner similar to Synthesis Example 3, 10 g of commercial maleic anhydride (Aldrich) are added to a solution of 210 g of Jeffamine® M-2070 (Huntsman corporation) in 500 mL of toluene. The reaction mixture is subjected to a Dean-Stark dehydration for 5 hours. The clear solution obtained is cooled to a temperature of 0° C., and 25.8 g of 1-octadecene and 1.6 g of azobis(isobutyronitrile) are added. The mixture is deaerated by nitrogen bubbling (100 mL/min) for one hour. The neutral gas sweeping is stopped, and the reaction mixture is heated to 80° C. for 24 hours. The solution which has a slightly brown coloration is washed three times with a 0.1 M sulfuric acid solution, then again three times with pure water. The supernatant solution is separated, and the toluene is evaporated. The result is a viscous liquid having a molecular weight of about 5000 g/mol (Polymer 2) which can be used in a rolling process.

Numerous modifications could be made to any of the embodiments described above without going beyond the scope of the invention as conceived. The references, patents or documents of the scientific literature mentioned in the present application are incorporated here by reference in their entirety and for all purposes.

Embodiments

1. A lubricating agent consisting of a polymer of Formula I

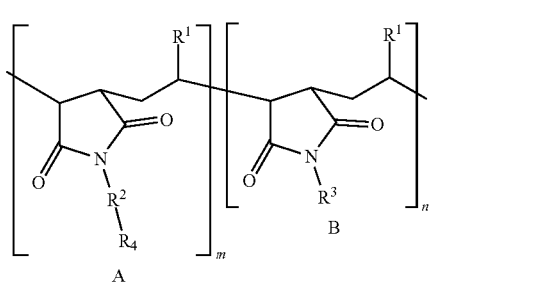

Formula I in which m and n denote the number of repeated units A and B, respectively, in the polymer; m being a positive whole number and n being a positive whole number or zero when the repeated unit B is absent, and where m and n are selected so that the molecular weight of the polymer of Formula I is in the range from 1000 to $10^6$;

$R^1$, independently at each occurrence, is selected from the linear or branched monovalent hydrocarbon radicals;

$R^2$, independently at each occurrence, is selected from —$CH_2CH_2O$— and —$CH_2CH_2CH_2O$—, where $R^2$ is bound to N by a carbon atom, or $R^2$ is absent and N is covalently bound to $R^4$;

$R^3$, independently at each occurrence, is selected from the linear or branched monovalent hydrocarbon radicals;

$R^4$, independently at each occurrence, is a polyether residue of formula —$[CH(R^5)CH_2O]_sCH_3$, where $5 \leq s \leq 100$; and $R^5$, independently at each occurrence, is a hydrogen atom or a $CH_3$ group.

2. The lubricating agent according to embodiment 1, in which m and n are selected so that the molecular weight of the lubricating agent of Formula I is in the range from 2000 to 250,000.

3. The lubricating agent according to embodiment 1 or 2, in which m and n are selected so that the molecular weight of the lubricating agent of Formula I is in the range from 2000 to 50,000.

4. The lubricating agent according to embodiment 1 or 2, in which m and n are selected so that the molecular weight of the lubricating agent of Formula I is in the range from 50,000 to 200,000.

5. The lubricating agent according to any one of embodiments 1 to 4, in which $R^1$, independently at each occurrence, is a linear or branched hydrocarbon radical of formula $C_rH_{2r+1}$, where $4 \leq r \leq 24$.

6. The lubricating agent according to any one of embodiments 1 to 5, in which $R^1$, independently at each occurrence, is a linear or branched hydrocarbon radical of formula $C_rH_{2r+1}$, where $8 \leq r \leq 18$.

7. The lubricating agent according to any one of embodiments 1 to 6, in which $R^3$, independently at each occurrence, is a linear or branched hydrocarbon radical of formula $C_tH_{2t+1}$, where $4 \leq t \leq 24$.

8. The lubricating agent according to any one of embodiments 1 to 7, in which $R^3$, independently at each occurrence, is a linear or branched hydrocarbon radical of formula $C_tH_{2t+1}$, where $8 \leq t \leq 18$.

9. The lubricating agent according to any one of embodiments 1 to 8, in which $8 \leq s \leq 50$.

10. The lubricating agent according to any one of embodiments 1 to 9, in which the ratio of the repeated units A:B expressed as mole percent in the polymer is in the range from 100:0 to 10:90.

11. The lubricating agent according to any one of embodiments 1 to 10, in which $R^2$ is a divalent radical of formula —$CH_2CH_2O$—.

12. The lubricating agent according to any one of embodiments 1 to 10, in which $R^2$ is a divalent radical of formula-$CH_2CH_2CH_2O$—.

13. The lubricating agent according to any one of embodiments 1 to 10, in which $R^2$ is absent.

14. The lubricating agent according to any one of embodiments 1 to 13, in which $R^4$ is a polyether residue of formula —$[CH(R^5)CH_2O]_sCH_3$, in which $R^5$ is $CH_3$ at each occurrence.

15. The lubricating agent according to any one of embodiments 1 to 13, in which $R^4$ is a polyether residue of formula —$[CH(R^5)CH_2O]_sCH_3$, in which $R^5$ is a hydrogen at each occurrence.

16. The lubricating agent according to any one of embodiments 1 to 13, in which $R^4$ is a polyether residue of formula —[CH($R^5$)CH$_2$O]$_s$CH$_3$, and in which $R^5$, independently at each occurrence, is CH$_3$ or hydrogen, such that $R^4$ is a polyether residue including repeated units of propylene oxide (PO) and of ethylene oxide (EO).

17. The lubricating agent according to embodiment 16, in which the polyether residue has a molar ratio of PO:EO between about 20:1 and about 1:30.

18. The lubricating agent according to embodiment 17, in which the molar ratio of PO:EO is between about 10:1 and about 1:10.

19. The lubricating agent according to any one of embodiments 14 to 18, in which the polyether residue has a molecular weight between about 300 g/mole and about 5000 g/mole.

20. The lubricating agent according to any one of embodiments 14 to 19, in which the polyether residue has a molecular weight between about 500 and about 2500 g/mole.

21. The lubricating agent according to embodiment 1, in which the lubricating agent is selected from Polymers 1 to 5 as defined in Table 1.

22. A composition including a lubricating agent according to any one of embodiments 1 to 21 jointly with a solvent that is inert with respect to the alkali metals.

23. The composition according to embodiment 22, in which the solvent is selected from the hydrocarbon solvents, the aromatic solvents and mixtures thereof.

24. The composition according to embodiment 23, in which the solvent is a system of solvents, including at least one aromatic solvent and at least one hydrocarbon solvent.

25. The composition according to embodiment 23 or 24, in which the hydrocarbon solvent is selected from hexane and heptane.

26. The composition according to embodiment 23 or 24, in which the aromatic solvent is toluene.

27. The composition according to any one of embodiments 22 to 26, in which the lubricating agent is present at a concentration from about 0.001% to about 10% (weight/volume) with respect to the total volume of the composition.

28. The composition according to embodiment 27, in which the lubricating agent is present at a concentration in the range from about 0.01% to about 5% (weight/volume) with respect to the total volume of the composition.

29. An alkali metal film having a first surface and a second surface, and including on at least one of the first and second surfaces, a thin layer of the lubricating agent as defined in any one of embodiments 1 to 21 or of the composition as defined in any one of embodiments 22 to 28.

30. The alkali metal film according to embodiment 29, having a thickness in the range from about 5 μm to about 50 μm.

31. The alkali metal film according to embodiment 29 or 30, in which said alkali metal is selected from lithium, the lithium alloys, sodium, and the sodium alloys.

32. The alkali metal film according to embodiment 31, in which the alkali metal is lithium having a purity of at least 99% by weight, or a lithium alloy including at least 3000 ppm of impurities by weight.

33. The alkali metal film according to any one of embodiments 29 to 32, including a passivation layer on at least one of the first and second surfaces thereof.

34. The alkali metal film according to embodiment 33, including a passivation layer on the first and second surfaces thereof.

35. The alkali metal film according to any one of embodiment 33 or 34, in which the passivation layer has a thickness of 100 Å or less or of 50 Å or less.

36. The alkali metal film according to any one of embodiments 33 to 35, in which the alkali metal is lithium or a lithium alloy, and the passivation layer includes Li$_2$O, Li$_2$CO$_3$, LiOH or a combination of at least two of said compounds.

37. A method for producing an alkali metal film, the method including the steps of:
a) application of a composition according to any one of embodiments 22 to 28 on at least one of the first and second surfaces of an alkali metal strip, in order to obtain a lubricated alkali metal strip; and
b) rolling the lubricated alkali metal strip obtained in step (a) between at least two rollers, in order to produce an alkali metal film.

38. The method according to embodiment 37, which is performed in an essentially dry air atmosphere.

39. The method according to embodiment 37 or 38, which is performed in an anhydrous chamber or a chamber with controlled humidity with a dew point between −45 and −55° C., for 0.7 to 2.2% relative humidity.

40. The method according to embodiment 39, in which the anhydrous chamber or the chamber with controlled humidity with a dew point of about −50° C. for a relative humidity of about 1.3%.

41. The method according to any one of embodiments 37 to 40, which includes, in addition, a step of obtention of the alkali metal strip, used in step (a), by extrusion of an ingot or rod made of an alkali metal.

42. The method according to any one of embodiments 37 to 41, in which step (a) is carried out by the application of the composition on the strip at the inlet of the rollers and/or by prior coating of the rolling rollers with or without additional addition of composition directly onto the strip before step (b).

43. The alkali metal film produced by a method as defined in any one of embodiments 37 to 42.

44. The alkali metal film according to embodiment 43, having a thickness in the range from about 5 μm to about 50 μm.

45. The alkali metal film according to embodiment 43 or 44, in which said alkali metal is selected from lithium, the lithium alloys, sodium, and the sodium alloys.

46. The alkali metal film according to embodiment 45, in which the alkali metal is lithium having a purity of at least 99% by weight, or a lithium alloy including less than 3000 ppm of impurities by weight.

47. The alkali metal film according to any one of embodiments 43 to 46, including a stable and uniform passivation layer on at least one of the first and second surfaces thereof.

48. The alkali metal film according to embodiment 47, including a passivation layer on the first and second surfaces thereof.

49. The alkali metal film according to embodiments 47 or 48, in which the passivation layer has a thickness of 100 Å or less, or of 50 Å or less.

50. The alkali metal film according to any one of embodiments 47 to 49, in which said alkali metal is lithium or a lithium alloy, and the passivation layer includes Li$_2$O, Li$_2$CO$_3$, LiOH or a combination of at least two of said compounds.

51. An electrode including an alkali metal film as defined in any one of embodiments 29 to 36 and 43 to 50.

The invention claimed is:

1. An alkali metal film having a first surface and a second surface, and comprising on at least one of the first and second surfaces, a thin layer of a lubricating agent, the lubricating agent consisting of a polymer of Formula I:

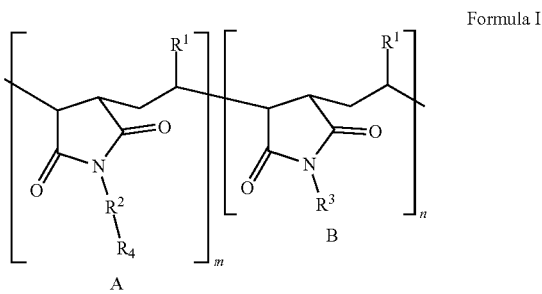

Formula I wherein,
m and n denote the number of repeated units A and B, respectively, in the polymer; m being a positive whole number and n being a positive whole number or zero when the repeated unit B is absent, and where m and n are selected so that the molecular weight of the polymer of Formula I is in the range from 1000 to $10^6$;
$R^1$ is independently at each occurrence selected from linear or branched monovalent hydrocarbon radicals;
$R^2$ is independently at each occurrence selected from —$CH_2CH_2O$— and —$CH_2CH_2CH_2O$—, where $R^2$ is bound to N by a carbon atom, or $R^2$ is absent and N is covalently bound to $R^4$;
$R^3$ is independently at each occurrence selected from the linear or branched monovalent hydrocarbon radicals;
$R^4$ is independently at each occurrence a polyether residue of formula —$[CH(R^5)CH_2O]_sCH_3$, wherein $5 \leq s \leq 100$; and
$R^5$ is independently at each occurrence a hydrogen atom or a $CH_3$ group.

2. The alkali metal film of claim 1, wherein m and n are selected so that the molecular weight of the lubricating agent of Formula I is in the range from 2000 to 250,000.

3. The alkali metal film of claim 2, wherein m and n are selected so that the molecular weight of the lubricating agent of Formula I is in the range from 2000 to 50,000.

4. The alkali metal film of claim 2, wherein m and n are selected so that the molecular weight of the lubricating agent of Formula I is in the range from 50,000 to 200,000.

5. The alkali metal film of claim 1, wherein $R^1$ is independently at each occurrence a linear or branched hydrocarbon radical of formula $C_rH_{2r+1}$, wherein $4 \leq r \leq 24$.

6. The alkali metal film of claim 1, wherein $R^1$ is independently at each occurrence a linear or branched hydrocarbon radical of formula $C_rH_{2r+1}$, wherein $8 \leq r \leq 18$.

7. The alkali metal film of claim 1, wherein $R^3$ is independently at each occurrence a linear or branched hydrocarbon radical of formula $C_tH_{2t+1}$, wherein $4 \leq t \leq 24$.

8. The alkali metal film of claim 1, wherein $R^3$ is independently at each occurrence a linear or branched hydrocarbon radical of formula $C_tH_{2t+1}$, wherein $8 \leq t \leq 18$.

9. The alkali metal film of claim 1, wherein $8 \leq s \leq 50$.

10. The alkali metal film of claim 1, wherein the ratio of the repeated units A:B expressed as mole percent in the polymer is in the range from 100:0 to 10:90.

11. The alkali metal film of claim 1, wherein $R^2$ is a divalent radical of formula —$CH_2CH_2O$—.

12. The alkali metal film of claim 1, wherein $R^2$ is a divalent radical of formula —$CH_2CH_2CH_2O$—.

13. The alkali metal film of claim 1, wherein $R^2$ is absent.

14. The alkali metal film of claim 1, wherein $R^4$ is selected from:
(a) a polyether residue of formula —$[CH(R^5)CH_2O]_sCH_3$, wherein $R^5$ is $CH_3$ at each occurrence;
(b) a polyether residue of formula —$[CH(R^5)CH_2O]_sCH_3$, wherein $R^5$ is a hydrogen at each occurrence; and
(c) a polyether residue of formula —$[CH(R^5)CH_2O]_sCH_3$, and in which $R^5$ is independently at each occurrence $CH_3$ or hydrogen, such that $R^4$ is a polyether residue including repeated units of propylene oxide (PO) and of ethylene oxide (EO).

15. The alkali metal film of claim 14, wherein the polyether residue has a molar ratio of PO:EO between about 20:1 and about 1:30.

16. The alkali metal film of claim 15, wherein the molar ratio of PO:EO is between about 10:1 and about 1:10.

17. The alkali metal film of claim 14, wherein the polyether residue has a molecular weight between about 300 g/mole and about 5000 g/mole.

18. The alkali metal film of claim 14, wherein the polyether residue has a molecular weight between about 500 g/mole and about 2500 g/mole.

19. The alkali metal film of claim 2, having a thickness in the range from about 5 μm to about 50 μm.

20. The alkali metal film of claim 2, wherein said alkali metal is selected from lithium, lithium alloys, sodium, and sodium alloys.

21. The alkali metal film of claim 20, wherein the alkali metal is lithium having a purity of at least 99% by weight, or a lithium alloy including at least 3000 ppm of impurities by weight.

22. The alkali metal film of claim 2, further comprising a passivation layer on at least one of the first and second surfaces thereof.

23. The alkali metal film of claim 2, further comprising a passivation layer on the first and second surfaces thereof.

24. The alkali metal film of claim 22, wherein the passivation layer has a thickness of 100 Å or less or of 50 Å or less.

25. The alkali metal film of claim 22, wherein the alkali metal is lithium or a lithium alloy, and the passivation layer includes $Li_2O$, $Li_2CO_3$, LiOH or a combination of at least two thereof.

26. The alkali metal film of claim 1, further comprising a solvent that is inert with respect to alkali metals.

27. The alkali metal film of claim 2, further comprising a solvent that is inert with respect to alkali metals.

* * * * *